(12) United States Patent
Wei

(10) Patent No.: US 10,684,511 B2
(45) Date of Patent: Jun. 16, 2020

(54) TRANSPARENT DISPLAY PANEL AND TRANSPARENT DISPLAY APPARATUS

(71) Applicant: BOE Technology Group Co., Ltd., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/015,595

(22) Filed: Jun. 22, 2018

(65) Prior Publication Data

US 2019/0064601 A1    Feb. 28, 2019

(30) Foreign Application Priority Data

Aug. 31, 2017 (CN) .......................... 2017 1 0775414

(51) Int. Cl.
*G02F 1/13357* (2006.01)
*F21V 8/00* (2006.01)

(52) U.S. Cl.
CPC ....... *G02F 1/133617* (2013.01); *G02B 6/005* (2013.01); *G02B 6/0036* (2013.01);
(Continued)

(58) Field of Classification Search
None
See application file for complete search history.

(56) References Cited

U.S. PATENT DOCUMENTS 10,620,469 B2   4/2020   Tan et al.
2004/0183988 A1   9/2004   Austin et al.
(Continued)

FOREIGN PATENT DOCUMENTS

CN   200944140 Y   9/2007
CN   102155781 A   8/2011
(Continued)

OTHER PUBLICATIONS

First Office Action dated Oct. 8, 2019 in Chinese Patent Application No. 201710775414.5 and English translation thereof.
(Continued)

*Primary Examiner* — Phu Vu
(74) *Attorney, Agent, or Firm* — McDermott Will & Emery LLP

(57) ABSTRACT

A transparent display panel and display apparatus are disclosed. The display apparatus includes: a first substrate; an optical waveguide member over the first substrate; a liquid crystal layer between the first substrate and the optical waveguide member, the transparent optical waveguide member having a light exit face facing towards the liquid crystal layer; a light source at a side surface of the optical waveguide member; light exit members distributed in an array on the light exit face of the optical waveguide member; and a photoluminescent layer on a side of the light exit members facing towards a light exit face of the display apparatus. The photoluminescent layer includes photoluminescent parts. A light entering the optical waveguide member exits through the light exit members, then enters the liquid crystal layer, and is controlled by the liquid crystal layer to irradiate the photoluminescent parts for performing a luminous display.

14 Claims, 4 Drawing Sheets

(52) U.S. Cl.
CPC .......... *G02B 6/0023* (2013.01); *G02B 6/0031* (2013.01); *G02B 6/0068* (2013.01); *G02F 1/133615* (2013.01)

(56) References Cited

U.S. PATENT DOCUMENTS

| | | | |
|---|---|---|---|
| 2011/0063542 A1* | 3/2011 | Park | G02B 6/0036 349/62 |
| 2016/0209577 A1* | 7/2016 | Ford | G02B 6/0036 |
| 2016/0265746 A1* | 9/2016 | Hirasawa | G02B 6/005 |
| 2017/0023830 A1* | 1/2017 | Yang | G02F 1/133617 |
| 2019/0033507 A1 | 1/2019 | Wang et al. | |
| 2019/0094575 A1 | 3/2019 | Wang et al. | |
| 2019/0339566 A1 | 11/2019 | Tan et al. | |

FOREIGN PATENT DOCUMENTS

| | | |
|---|---|---|
| CN | 104460098 A | 3/2015 |
| CN | 105869036 A | 8/2016 |
| CN | 106292049 A | 1/2017 |
| CN | 106292052 A | 1/2017 |
| CN | 107918233 A | 4/2018 |
| WO | 2014081415 A1 | 5/2014 |

OTHER PUBLICATIONS

Office Action issued in corresponding Chinese Patent Application No. 201710775414.5, dated Mar. 16, 2020.

\* cited by examiner

TRANSPARENT DISPLAY PANEL AND TRANSPARENT DISPLAY APPARATUS

CROSS-REFERENCE TO RELATED APPLICATION

This application claims the benefit of Chinese Patent Application No. 201710775414.5, filed with the State Intellectual Property Office of China on Aug. 31, 2017, the whole disclosure of which is incorporated herein by reference.

TECHNICAL FIELD

Embodiments of the present disclosure relate to a transparent display panel and a transparent display apparatus.

BACKGROUND

Generally, a transparent display is a display that can assume a transparent state so that a viewer can see an image displayed on the display and a scene behind the display.

SUMMARY

Embodiments of the present disclosure provide a transparent display apparatus including: a first transparent substrate; a transparent optical waveguide member over the first transparent substrate; a liquid crystal layer between the first transparent substrate and the transparent optical waveguide member, wherein the transparent optical waveguide member has a light exit face facing towards the liquid crystal layer, and a plurality of side surfaces; a light source at one of the side surfaces of the transparent optical waveguide member; a plurality of transparent light exit members distributed in an array on the light exit face of the transparent optical waveguide member; and a transparent photoluminescent layer on a side of the transparent light exit members facing towards a light exit face of the transparent display apparatus, the transparent photoluminescent layer including a plurality of photoluminescent parts in one-to-one correspondence with the transparent light exit members, wherein a light of the light source entering the transparent optical waveguide member exits through the transparent light exit members, then enters the liquid crystal layer, and is controlled by the liquid crystal layer to irradiate the photoluminescent parts for performing a luminous display.

According to embodiments of the present disclosure, the transparent display apparatus further includes: a first electrode and a second electrode respectively disposed on two sides of the liquid crystal layer, and configured to control liquid crystal molecules of the liquid crystal layer to deflect so that the light entering the liquid crystal layer is controlled to irradiate the photoluminescent parts.

According to embodiments of the present disclosure, the first electrode includes a plurality of discrete electrodes in one-to-one correspondence with the photoluminescent parts.

According to embodiments of the present disclosure, the second electrode includes a continuous electrode.

According to embodiments of the present disclosure, the transparent display apparatus further includes: a plurality of discrete first electrodes which are disposed on a side of the transparent optical waveguide member facing away from the liquid crystal layer and which are in one-to-one correspondence with the photoluminescent parts; and a second electrode which is a continuous electrode disposed on a side of the first transparent substrate facing towards the liquid crystal layer, wherein the photoluminescent layer is disposed between the second electrode and the first transparent substrate.

According to embodiments of the present disclosure, the transparent display apparatus further includes: a second electrode which is a continuous electrode disposed on a side of the transparent optical waveguide member facing away from the liquid crystal layer; and a plurality of discrete first electrodes which are disposed on a side of the first transparent substrate facing towards the liquid crystal layer and which are in one-to-one correspondence with the photoluminescent parts, wherein the photoluminescent layer is disposed between the first electrodes and the first transparent substrate.

According to embodiments of the present disclosure, an orthogonal projection of each of the first electrodes on the first transparent substrate overlaps an orthogonal projection of one, corresponding to the each of the first electrodes, of the photoluminescent parts on the first transparent substrate.

According to embodiments of the present disclosure, an orthogonal projection of a center of each of the first electrodes on the first transparent substrate is spaced from an orthogonal projection of a center of one, opposite to the each of the first electrodes, of the light exit members on the first transparent substrate by a first preset value.

According to embodiments of the present disclosure, the light source includes a light source configured to emit a first light having a first preset wavelength, and the photoluminescent layer is configured to emit a preset monochromatic light when the photoluminescent layer is irradiated by the first light having the first preset wavelength.

According to embodiments of the present disclosure, the photoluminescent layer is a single-layer photoluminescent layer.

According to embodiments of the present disclosure, the light source includes: a first sub-light source configured to emit a second light having a second preset wavelength, a second sub-light source configured to emit a third light having a third preset wavelength, and a third sub-light source configured to emit a fourth light having a fourth preset wavelength, and the photoluminescent layer includes: a first sub-photoluminescent part configured to emit a light of a first color, a second sub-photoluminescent part configured to emit a light of a second color, and a third sub-photoluminescent part configured to emit a light of a third color; and the first sub-photoluminescent part is configured to emit the light of the first color when the first sub-photoluminescent part is irradiated by the second light of the first sub-light source, the second sub-photoluminescent part is configured to emit the light of the second color when the second sub-photoluminescent part is irradiated by the third light of the second sub-light source, and the third sub-photoluminescent part is configured to emit the light of the third color when the third sub-photoluminescent part is irradiated by the fourth light of the third sub-light source.

According to embodiments of the present disclosure, the light source includes: a first sub-light source configured to emit a second light having a second preset wavelength, a second sub-light source configured to emit a third light having a third preset wavelength, and a third sub-light source configured to emit a fourth light having a fourth preset wavelength, the photoluminescent layer is a single-layer photoluminescent layer, the photoluminescent parts each include: a first sub-photoluminescent part configured to emit a light of a first color, a second sub-photoluminescent part configured to emit a light of a second color, and a third sub-photoluminescent part configured to emit a light of a third color, and the first sub-photoluminescent part, the second sub-photoluminescent part, and the third sub-photoluminescent part are arranged in sequence; and the first sub-photoluminescent part is configured to emit the light of the first color when the first sub-photoluminescent part is irradiated by the second light of the first sub-light source, the second sub-photoluminescent part is configured to emit the light of the second color when the second sub-photoluminescent part is irradiated by the third light of the second sub-light source, and the third sub-photoluminescent part is configured to emit the light of the third color when the third sub-photoluminescent part is irradiated by the fourth light of the third sub-light source.

According to embodiments of the present disclosure, the light source includes: a first sub-light source configured to emit a second light having a second preset wavelength, a second sub-light source configured to emit a third light having a third preset wavelength, and a third sub-light source configured to emit a fourth light having a fourth preset wavelength, the photoluminescent layer is a multi-layer photoluminescent layer including a first sub-photoluminescent layer configured to emit a light of a first color, a second sub-photoluminescent layer configured to emit a light of a second color, and a third sub-photoluminescent layer configured to emit a light of a third color, each of the photoluminescent parts includes a first sub-photoluminescent part configured to emit the light of the first color, a second sub-photoluminescent part configured to emit the light of the second color, and a third sub-photoluminescent part configured to emit the light of the third color, and the first sub-photoluminescent part, the second sub-photoluminescent part, and the third sub-photoluminescent part are stacked in sequence; and the first sub-photoluminescent part of the photoluminescent part is configured to emit the light of the first color when the photoluminescent part is irradiated by the second light of the first sub-light source, the second sub-photoluminescent part of the photoluminescent part is configured to emit the light of the second color when the photoluminescent part is irradiated by the third light of the second sub-light source, and the third sub-photoluminescent part of the photoluminescent part is configured to emit the light of the third color when the photoluminescent part is irradiated by the fourth light of the third sub-light source.

According to embodiments of the present disclosure, the light of the first color is red light, the light of the second color is green light, and the light of the third color is blue light.

According to embodiments of the present disclosure, the transparent optical waveguide member includes a transparent substrate which has a greater refractive index than the liquid crystal layer.

According to embodiments of the present disclosure, the transparent optical waveguide member includes a second transparent substrate, and an optical waveguide device disposed on a side of the second transparent substrate facing towards the liquid crystal layer, the optical waveguide device has a greater refractive index than both of the second transparent substrate and the liquid crystal layer, and the light source is disposed at a side surface of the optical waveguide device.

According to embodiments of the present disclosure, the transparent display apparatus further includes: a polarizer disposed between the light source and the transparent optical waveguide member, wherein each of the light exit members includes a grating.

Embodiments of the present disclosure further provide a transparent display panel including: a first transparent substrate; a transparent optical waveguide member over the first transparent substrate; a liquid crystal layer between the first transparent substrate and the transparent optical waveguide member, wherein the transparent optical waveguide member has a light exit face facing towards the liquid crystal layer, and a plurality of side surfaces; a plurality of transparent light exit members distributed in an array the light exit face of the transparent optical waveguide member; and a transparent photoluminescent layer on a side of the transparent light exit members facing towards a light exit face of the transparent display apparatus, wherein the transparent photoluminescent layer includes a plurality of photoluminescent parts in one-to-one correspondence with the transparent light exit members.

According to embodiments of the present disclosure, the transparent display panel further includes: a first electrode and a second electrode respectively disposed on two sides of the liquid crystal layer, and configured to control liquid crystal molecules of the liquid crystal layer to deflect.

According to embodiments of the present disclosure, the first electrode includes a plurality of discrete electrodes in one-to-one correspondence with the photoluminescent parts.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 3b is a partially enlarged schematic diagram showing the configuration of the transparent display apparatus shown in FIG. 3a;

DETAILED DESCRIPTION OF THE EMBODIMENTS

Figure 1:
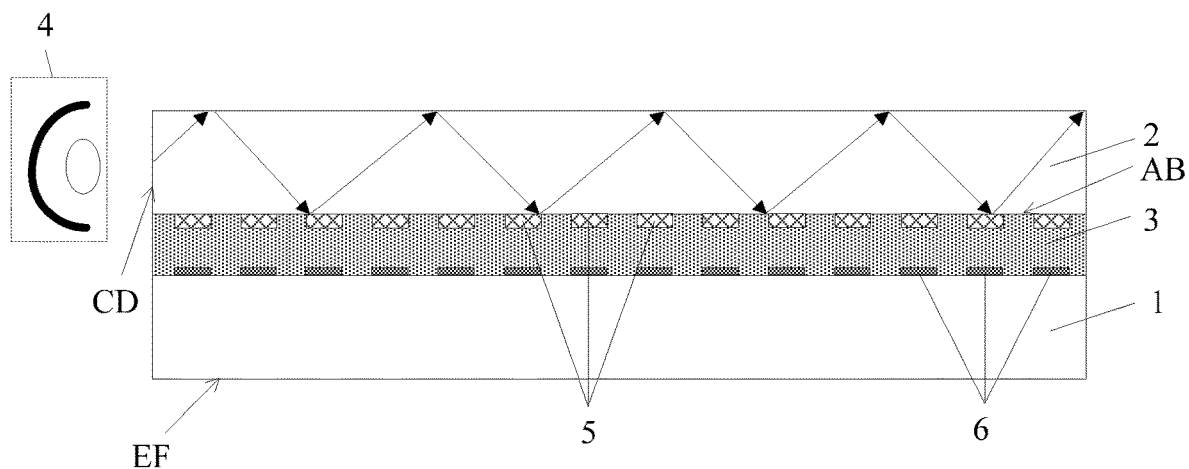
FIG. 1 is a schematic diagram showing a configuration of a transparent display apparatus according to an embodiment of the present disclosure.

Embodiments of the disclosure will be described in detail as below in combination with the accompanying drawings. It should be noted that like reference numerals refer to like elements or elements having like function throughout. The embodiments described below with reference to the accompany drawings are illustrative, are only used to explain the present disclosure, and should not be construed to limit the present disclosure.

Referring to FIG. 1, embodiments of the present disclosure provide a transparent display apparatus. The transparent display apparatus includes: a first transparent substrate 1; a transparent optical waveguide member 2 over the first transparent substrate 1; a liquid crystal layer 3 between the first transparent substrate 1 and the transparent optical waveguide member 2, the transparent optical waveguide member 2 having a light exit face AB facing towards the liquid crystal layer 3, and a plurality of side surfaces CD; a light source 4 at one of the side surfaces CD of the transparent optical waveguide member 2; a plurality of transparent light exit members 5 distributed in an array on the light exit face AB of the transparent optical waveguide member 2; and a transparent photoluminescent layer on a side of the transparent light exit members 5 facing towards a light exit face EF of the transparent display apparatus. The transparent photoluminescent layer includes a plurality of photoluminescent parts 6 in one-to-one correspondence with the transparent light exit members 5. A light of the light source 4 entering the transparent optical waveguide member 2 exits through the transparent light exit members 5, then enters the liquid crystal layer 3, and is controlled by the liquid crystal layer 3 to irradiate the photoluminescent parts 6 for performing a luminous display.

With the transparent display apparatus according to the embodiment of the present disclosure, the transparent display apparatus includes the transparent optical waveguide member, the light source at one of the side surfaces of the transparent optical waveguide member, and the plurality of transparent light exit members distributed in an array on the light exit face of the transparent optical waveguide member. Thereby, a light of the light source entering the transparent optical waveguide member exits through the transparent light exit members, and then is irradiated onto the photoluminescent layer. When the photoluminescent layer is excited by the light, a luminous display is achieved. As a result, the transparent display apparatus performs a highly transparent display.

According to an example of the present disclosure, two electrode layers are further disposed on upper and lower sides of the liquid crystal layer, respectively, and are configured to control liquid crystal molecules of the liquid crystal layer to deflect, thereby controlling a luminous flux of light entering each of the photoluminescent parts. Specifically, at least one of the two electrode layers has discrete electrodes which are in one-to-one correspondence with the photoluminescent parts and which are separate from one another, thereby controlling pixel units of the display apparatus independently. For example, the transparent display apparatus further includes: a first electrode and a second electrode respectively disposed on two sides of the liquid crystal layer, and configured to control liquid crystal molecules of the liquid crystal layer to deflect to control the light entering the liquid crystal layer to irradiate the photoluminescent parts. The first electrode may include a plurality of discrete electrodes in one-to-one correspondence with the photoluminescent parts, while the second electrode may include a continuous electrode. A description will be made as below by specific examples, respectively.

Figure 2:
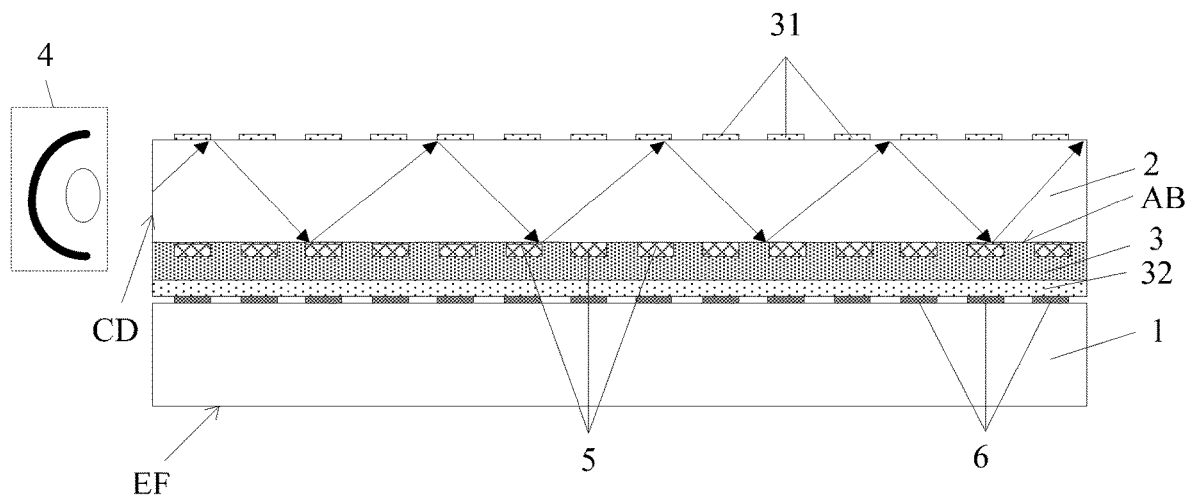
FIG. 2 is a schematic diagram showing a configuration of a transparent display apparatus provided with electrode layers, according to an embodiment of the present disclosure.

As an example, referring to FIG. 2, the transparent display apparatus may further include: a plurality of discrete first electrodes 31 which are disposed on a side of the transparent optical waveguide member 2 facing away from the liquid crystal layer 3 and which are in one-to-one correspondence with the photoluminescent parts 6; and a continuous second electrode 32 which is disposed on a side of the first transparent substrate 1 facing towards the liquid crystal layer 3. The photoluminescent layer may be disposed between the second electrode 32 and the first transparent substrate 1.

Figure 3A:
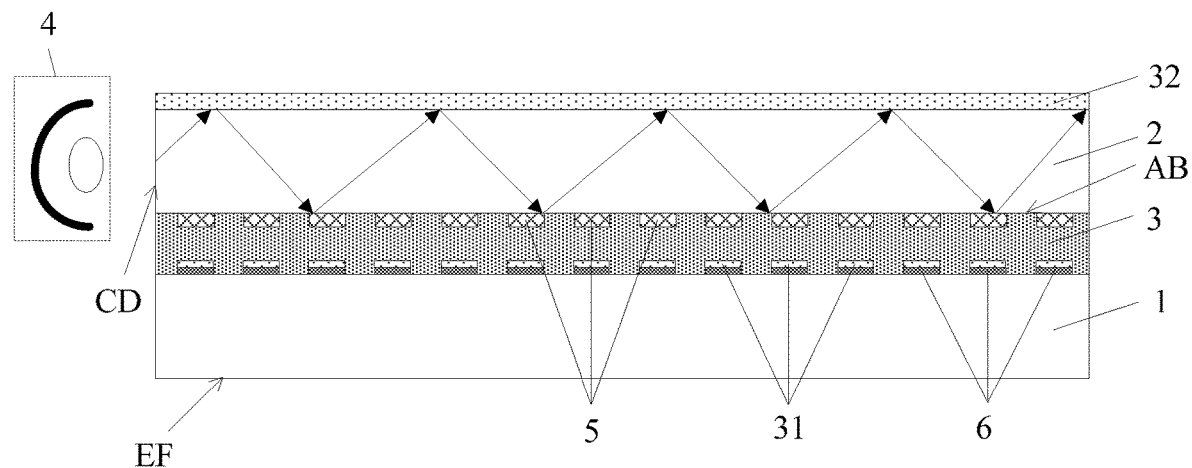
FIG. 3a is a schematic diagram showing a configuration of a transparent display apparatus provided with electrode layers, according to another embodiment of the present disclosure.

As another example, referring to FIG. 3a, the transparent display apparatus may further include: a continuous second electrode 32 which is disposed on a side of the transparent optical waveguide member 2 facing away from the liquid crystal layer 3; and a plurality of discrete first electrodes 31 which are disposed on a side of the first transparent substrate 1 facing towards the liquid crystal layer 3 and which are in one-to-one correspondence with the photoluminescent parts 6. The photoluminescent layer may be disposed between the first electrodes 31 and the first transparent substrate 1.

Figure 3B:
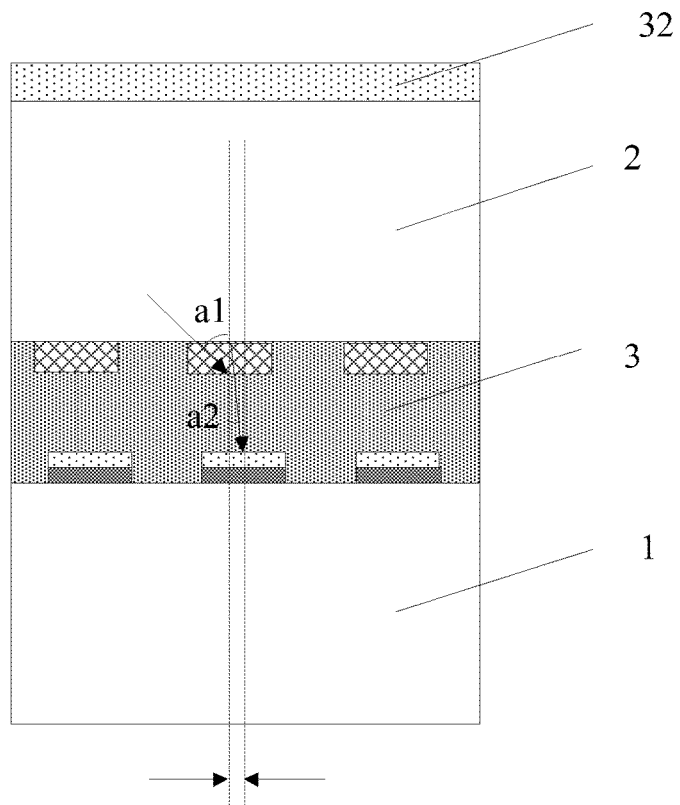

According to an example of the present disclosure, the photoluminescent parts 6 constitute pixel units of the display apparatus. In order to control the pixel units of the display apparatus independently, an orthogonal projection of each of the first electrodes 31 on the first transparent substrate 1 overlaps an orthogonal projection of one, corresponding to the each of the first electrodes 31, of the photoluminescent parts 6 on the first transparent substrate 1. In order that a light exiting each of the transparent light exit members 5 is maximally irradiated onto a corresponding one of the photoluminescent parts 6, each of the transparent light exit members 5 may be offset from a corresponding one of the discrete first electrodes 31 to a certain extent. In other words, an orthogonal projection of a center of each of the first electrodes 31 on the first transparent substrate 1 is spaced from an orthogonal projection of a center of one, opposite to the each of the first electrodes 31, of the transparent light exit members 5 on the first transparent substrate 1 by a first preset value. The first preset value may be obtained by tests or by calculation based on actual parameters. For example, the calculation may be carried out based on a structure shown in FIG. 3b. FIG. 3b is a partially enlarged schematic diagram of the display apparatus shown in FIG. 3a. The first preset value $d=\tan(a2)*h$, where h is a thicknesses of the liquid crystal layer, and a2 is an emergence angle of an emergent light. The light is totally reflected in the transparent optical waveguide member, and the transparent light exit members have a same refractive index as the transparent optical waveguide member. An angle of incidence a1 of a light which is from each of the transparent light exit members and which is incident on the liquid crystal layer is a determined value. A value of $\sin(a2)$ can be determined according to $\sin(a1)N=\sin(a2)Ne$. Therefore, a value of $\tan(a2)$ can be determined. Herein, N is the refractive index of the transparent light exit members, and Ne is a refractive index of the liquid crystal layer.

According to an example of the present disclosure, the transparent display apparatus according to the embodiments of the present disclosure may be a monochromatic transparent display apparatus, or a color transparent display apparatus. A description will be made as below by examples, respectively.

As an example, referring to FIG. 1, the light source 4 is a light source configured to emit a first light having a first preset wavelength, the photoluminescent layer is a single-layer photoluminescent layer, and the photoluminescent layer is configured to emit a preset monochromatic light when irradiated by the first light having the first preset wavelength. In the embodiments of the present disclosure, the light source is the light source configured to emit the first light having the first preset wavelength, the photoluminescent layer is the single-layer photoluminescent layer, and the photoluminescent layer is configured to emit the preset monochromatic light when irradiated by the first light having the first preset wavelength and emitted by the light source. Thereby, the transparent display apparatus can achieve a monochromatic display. The first light having the first preset wavelength corresponds to a material of the photoluminescent layer, so that the material of the photoluminescent layer emits a light with a preset color when the material of the photoluminescent layer is irradiated by the first light having the first preset wavelength.

Figure 4:
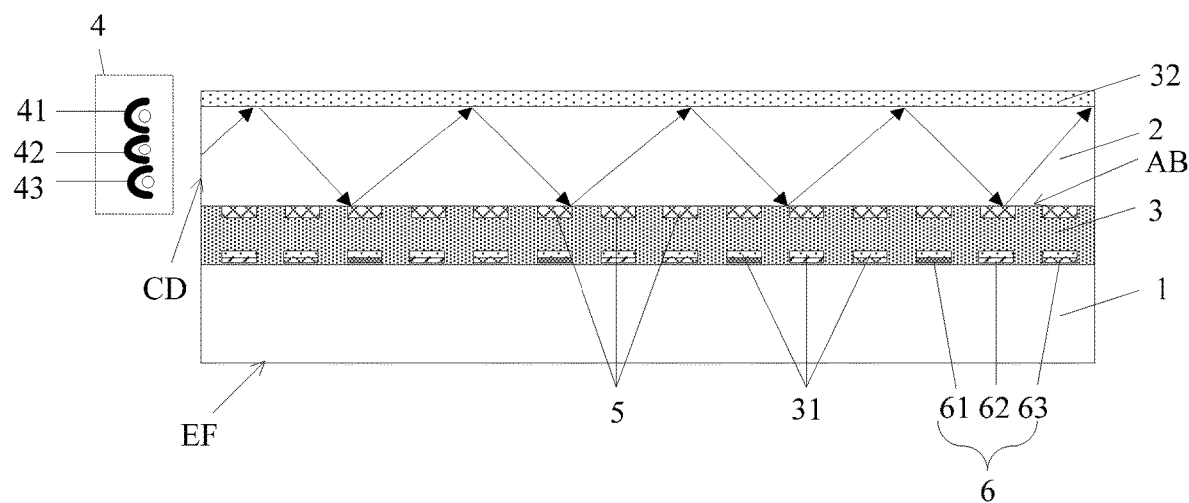
FIG. 4 is a schematic diagram showing a configuration of a transparent display apparatus with a single-layer photoluminescent layer, according to an embodiment of the present disclosure.

According to an example of the present disclosure, the photoluminescent layer may be a single-layer film. For example, referring to FIG. 4, the light source 4 includes: a first sub-light source 41 configured to emit a second light having a second preset wavelength, a second sub-light source 42 configured to emit a third light having a third preset wavelength, and a third sub-light source 43 configured to emit a fourth light having a fourth preset wavelength, the photoluminescent layer is a single-layer photoluminescent layer, the photoluminescent parts each include: a first sub-photoluminescent part 61 configured to emit a red light, a second sub-photoluminescent part 62 configured to emit a green light, and a third sub-photoluminescent part 63 configured to emit a blue light, and the first sub-photoluminescent part 61, the second sub-photoluminescent part 62, and the third sub-photoluminescent part 63 are arranged in sequence; and the first sub-photoluminescent part 61 is configured to emit the red light when the first sub-photoluminescent part 61 is irradiated by the second light of the first sub-light source 41, the second sub-photoluminescent part 62 is configured to emit the green light when the second sub-photoluminescent part 62 is irradiated by the third light of the second sub-light source 42, and the third sub-photoluminescent part 63 is configured to emit the blue light when the third sub-photoluminescent part 63 is irradiated by the fourth light of the third sub-light source 43. The first sub-light source 41, the second sub-light source 42, and the third sub-light source 43 may be juxtaposed at the side surface of the transparent optical waveguide member 2, as shown in FIG. 4.

Figure 5:
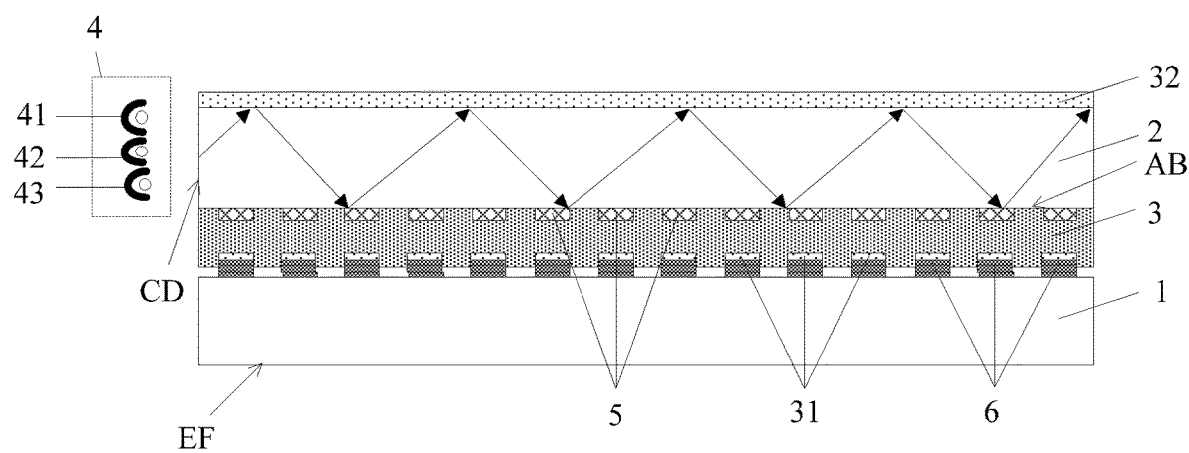
FIG. 5 is a schematic diagram showing a configuration of a transparent display apparatus with a multilayer photoluminescent layer, according to an embodiment of the present disclosure.

According to another example of the present disclosure, the photoluminescent layer may also be a multilayer film including a first sub-photoluminescent layer configured to emit a red light, a second sub-photoluminescent layer configured to emit a green light, and a third sub-photoluminescent layer configured to emit a blue light. For example, referring to FIG. 5, according to embodiments of the present disclosure, the light source 4 includes: a first sub-light source 41 configured to emit a second light having a second preset wavelength, a second sub-light source 42 configured to emit a third light having a third preset wavelength, and a third sub-light source 43 configured to emit a fourth light having a fourth preset wavelength; the photoluminescent layer is a multilayer photoluminescent layer, each of the photoluminescent parts 6 includes a first sub-photoluminescent part configured to emit a red light, a second sub-photoluminescent part configured to emit a green light, and a third sub-photoluminescent part configured to emit a blue light, and the first sub-photoluminescent part, the second sub-photoluminescent part, and the third sub-photoluminescent part are stacked in sequence; and the first sub-photoluminescent part of the photoluminescent part is configured to emit the red light when the photoluminescent part is irradiated by the second light of the first sub-light source 41, the second sub-photoluminescent part of the photoluminescent part is configured to emit the green light when the photoluminescent part is irradiated by the third light of the second sub-light source 42, and the third sub-photoluminescent part of the photoluminescent part is configured to emit the blue light when the photoluminescent part is irradiated by the fourth light of the third sub-light source 43.

Of course, for a monochromatic display and a color display of the transparent display apparatus, the monochromatic display and the color display of the transparent display apparatus may be performed in a time sequence. Specifically, the transparent display of the transparent display apparatus may be achieved by controlling a timing when the transparent electrodes are powered on and a timing when the light source emits a light. For a specific displaying manner, reference may be made to a displaying manner in related art. For example, the transparent display apparatus may include a control circuit and a thin film transistor so as to control deflections of liquid crystal molecules of the liquid crystal layer 3 through the first electrode 31 and the second electrode 32.

Figure 6:
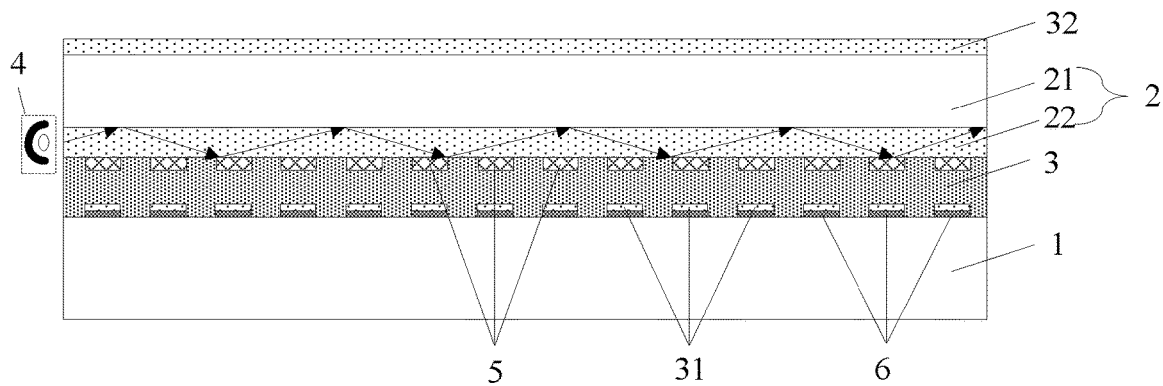
FIG. 6 is a schematic diagram showing a configuration of a transparent display apparatus with an optical waveguide device, according to an embodiment of the present disclosure.

According to an example of the present disclosure, referring to FIG. 1, the transparent optical waveguide member may be a transparent glass substrate which has a greater refractive index than the liquid crystal layer. Alternatively, referring to FIG. 6, the transparent optical waveguide member 2 may include a second transparent substrate 21, and an optical waveguide device 22 disposed on a side of the second transparent substrate 21 facing towards the liquid crystal layer 3, the optical waveguide device 22 has a greater refractive index than both of the second transparent substrate 21 and the liquid crystal layer 3, and the light source 4 is disposed at a side surface of the optical waveguide device 22.

Figure 7:
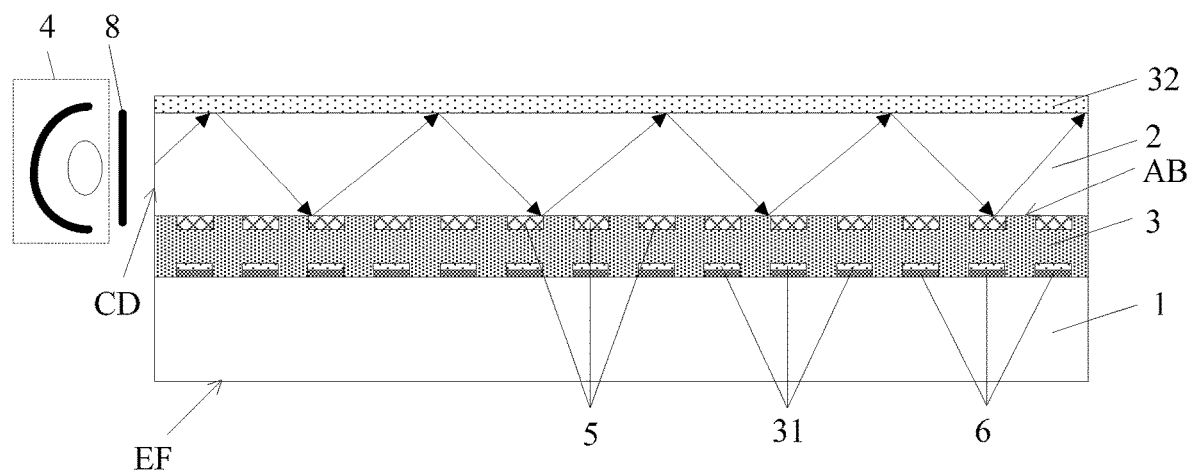
FIG. 7 is a schematic diagram showing a configuration of a transparent display apparatus provided with a polarizer, according to an embodiment of the present disclosure.

According to an example of the present disclosure, each of the light exit members may be a grating. In the case where each of the light exit members 5 is a grating, referring to FIG. 7, a polarizer 8 may be disposed between the light source 4 and the transparent optical waveguide member 2, so that a light entering the transparent optical waveguide member 2 exits at preset positions. Of course, the transparent light exit members 5 may also be any other members through which a light transmitted in the transparent optical waveguide member can exit. For example, the transparent light exit members 5 may also be optical coupling devices.

Figure 8:
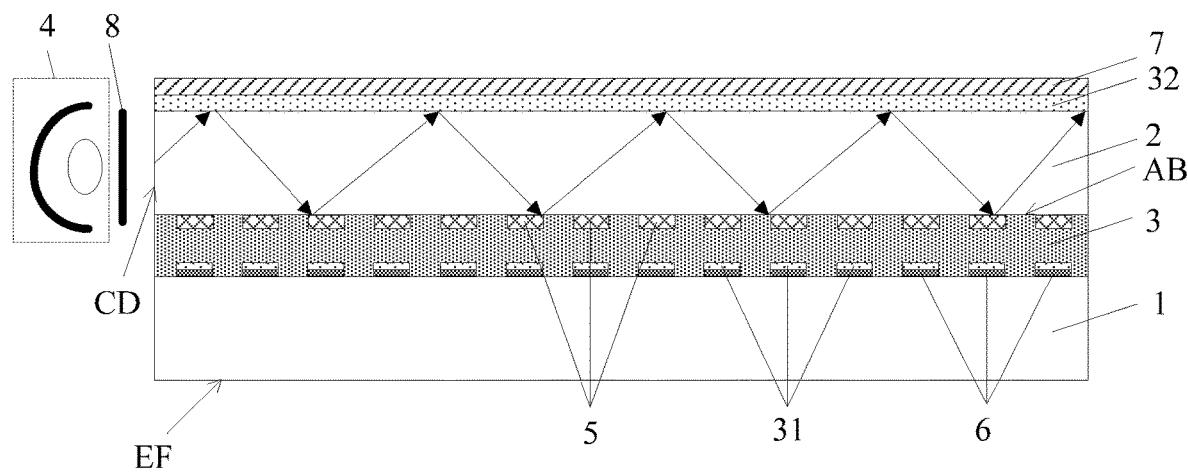
FIG. 8 is a schematic diagram showing a configuration of a transparent display apparatus provided with a protective layer, according to an embodiment of the present disclosure.

According to an example of the present disclosure, referring to FIG. 8, a protective layer 7 may further be disposed on a side of the transparent optical waveguide member 2 facing away from the liquid crystal layer 3. Specifically, the protective layer 7 may be located on the second electrode 32.

An array substrate of a display panel of the transparent display apparatus according to an embodiment of the present disclosure includes a metal oxide thin film transistor. In the metal oxide thin film transistor, a metal nanoparticle layer serves as a protective layer for an active layer, and can protect the active layer when a source electrode and a drain electrode are etched, so as to avoid defects caused by corrosion of the active layer. In addition, the metal nanoparticle layer has a good electrical conductivity, a good thermal stability, and leads to lower requirements for a manufacturing process of the metal oxide thin film transistor, so that the metal oxide thin film transistor can be manufactured with a simple process and at low cost.

Embodiments of the present disclosure further provide a transparent display panel. The transparent display panel includes: a first transparent substrate; a transparent optical waveguide member over the first transparent substrate; a liquid crystal layer between the first transparent substrate and the transparent optical waveguide member, the transparent optical waveguide member having a light exit face facing towards the liquid crystal layer, and a plurality of side surfaces; a plurality of transparent light exit members distributed in an array on the light exit face of the transparent optical waveguide member; and a transparent photoluminescent layer on a side of the transparent light exit members facing towards a light exit face of the transparent display apparatus. The transparent photoluminescent layer includes a plurality of photoluminescent parts in one-to-one correspondence with the transparent light exit members.

For a configuration of the transparent display panel according to the present embodiment, reference may be made to the configuration of the display panel of the above display apparatus, and the configuration of the transparent display panel according to the present embodiment is no longer described herein for the sake of brevity.

Apparently, various changes and modifications to the present disclosure may be made by those skilled in the art without departing from the spirit and scope of the disclosure. Therefore, if these amendments and modifications to the present disclosure belong to the scope defined in the appended claims of the present disclosure and their equivalents, the present disclosure is intended to include the changes and modifications.

What is claimed is:

1. A transparent display apparatus comprising:
   a first transparent substrate;
   a transparent optical waveguide member over the first transparent substrate;
   a liquid crystal layer between the first transparent substrate and the transparent optical waveguide member, wherein the transparent optical waveguide member has a light exit face facing towards the liquid crystal layer, and a plurality of side surfaces;
   a light source at one of the side surfaces of the transparent optical waveguide member;
   a plurality of transparent light exit members distributed in an array on the light exit face of the transparent optical waveguide member; and
   a transparent photoluminescent layer on a side of the transparent light exit members facing towards a light exit face of the transparent display apparatus, the transparent photoluminescent layer comprising a plurality of photoluminescent parts in one-to-one correspondence with the transparent light exit members,
   wherein a light of the light source entering the transparent optical waveguide member exits through the transparent light exit members, then enters the liquid crystal layer, and is controlled by the liquid crystal layer to irradiate the photoluminescent parts for performing a luminous display,
   wherein the light source comprises: a first sub-light source configured to emit a first light having a first preset wavelength, a second sub-light source configured to emit a second light having a second preset wavelength, and a third sub-light source configured to emit a third light having a third preset wavelength, and each of the photoluminescent parts comprises: a first sub-photoluminescent part configured to emit a light of a first color, a second sub-photoluminescent part configured to emit a light of a second color, and a third sub-photoluminescent part configured to emit a light of a third color, and
   wherein the first sub-photoluminescent part is configured to emit the light of the first color when the first sub-photoluminescent part is irradiated by the first light of the first sub-light source, the second sub-photoluminescent part is configured to emit the light of the second color when the second sub-photoluminescent part is irradiated by the second light of the second sub-light source, and the third sub-photoluminescent part is configured to emit the light of the third color when the third sub-photoluminescent part is irradiated by the third light of the third sub-light source.

2. The transparent display apparatus of claim 1, further comprising:
   a first electrode and a second electrode respectively disposed on two sides of the liquid crystal layer, and configured to control liquid crystal molecules of the liquid crystal layer to deflect so that the light entering the liquid crystal layer is controlled to irradiate the photoluminescent parts.

3. The transparent display apparatus of claim 2, wherein:
   the first electrode comprises a plurality of discrete electrodes in one-to-one correspondence with the photoluminescent parts.

4. The transparent display apparatus of claim 3, wherein:
   the second electrode comprises a continuous electrode.

5. The transparent display apparatus of claim 1, further comprising:
   a plurality of discrete first electrodes which are disposed on a side of the transparent optical waveguide member facing away from the liquid crystal layer and which are in one-to-one correspondence with the photoluminescent parts; and
   a second electrode which is a continuous electrode disposed on a side of the first transparent substrate facing towards the liquid crystal layer, wherein the photoluminescent layer is disposed between the second electrode and the first transparent substrate.

6. The transparent display apparatus of claim 1, further comprising:
   a second electrode which is a continuous electrode disposed on a side of the transparent optical waveguide member facing away from the liquid crystal layer; and
   a plurality of discrete first electrodes which are disposed on a side of the first transparent substrate facing towards the liquid crystal layer and which are in one-to-one correspondence with the photoluminescent parts,
   wherein the photoluminescent layer is disposed between the first electrodes and the first transparent substrate.

7. The transparent display apparatus of claim 3, wherein:
   an orthogonal projection of each of the first electrodes on the first transparent substrate overlaps an orthogonal projection of one, corresponding to the each of the first electrodes, of the photoluminescent parts on the first transparent substrate.

8. The transparent display apparatus of claim 7, wherein:
   an orthogonal projection of a center of each of the first electrodes on the first transparent substrate is spaced from an orthogonal projection of a center of one, opposite to the each of the first electrodes, of the light exit members on the first transparent substrate by a first preset value.

9. The transparent display apparatus of claim 1, wherein:
the photoluminescent layer is a single-layer photoluminescent layer, and the first sub-photoluminescent part, the second sub-photoluminescent part, and the third sub-photoluminescent part are arranged in sequence.

10. The transparent display apparatus of claim 1, wherein:
the photoluminescent layer is a multilayer photoluminescent layer comprising a first sub-photoluminescent layer configured to emit a light of a first color, a second sub-photoluminescent layer configured to emit a light of a second color, and a third sub-photoluminescent layer configured to emit a light of a third color, and the first sub-photoluminescent part, the second sub-photoluminescent part, and the third sub-photoluminescent part are stacked in sequence.

11. The transparent display apparatus of claim 1, wherein:
the light of the first color is red light, the light of the second color is green light, and the light of the third color is blue light.

12. The transparent display apparatus of claim 1, wherein:
the transparent optical waveguide member comprises a transparent substrate which has a greater refractive index than the liquid crystal layer.

13. The transparent display apparatus of claim 1, wherein:
the transparent optical waveguide member comprises a second transparent substrate, and an optical waveguide device disposed on a side of the second transparent substrate facing towards the liquid crystal layer, the optical waveguide device has a greater refractive index than both of the second transparent substrate and the liquid crystal layer, and the light source is disposed at a side surface of the optical waveguide device.

14. The transparent display apparatus of claim 1, further comprising:
a polarizer disposed between the light source and the transparent optical waveguide member, wherein each of the light exit members comprises a grating.

* * * * *